Figure 1:
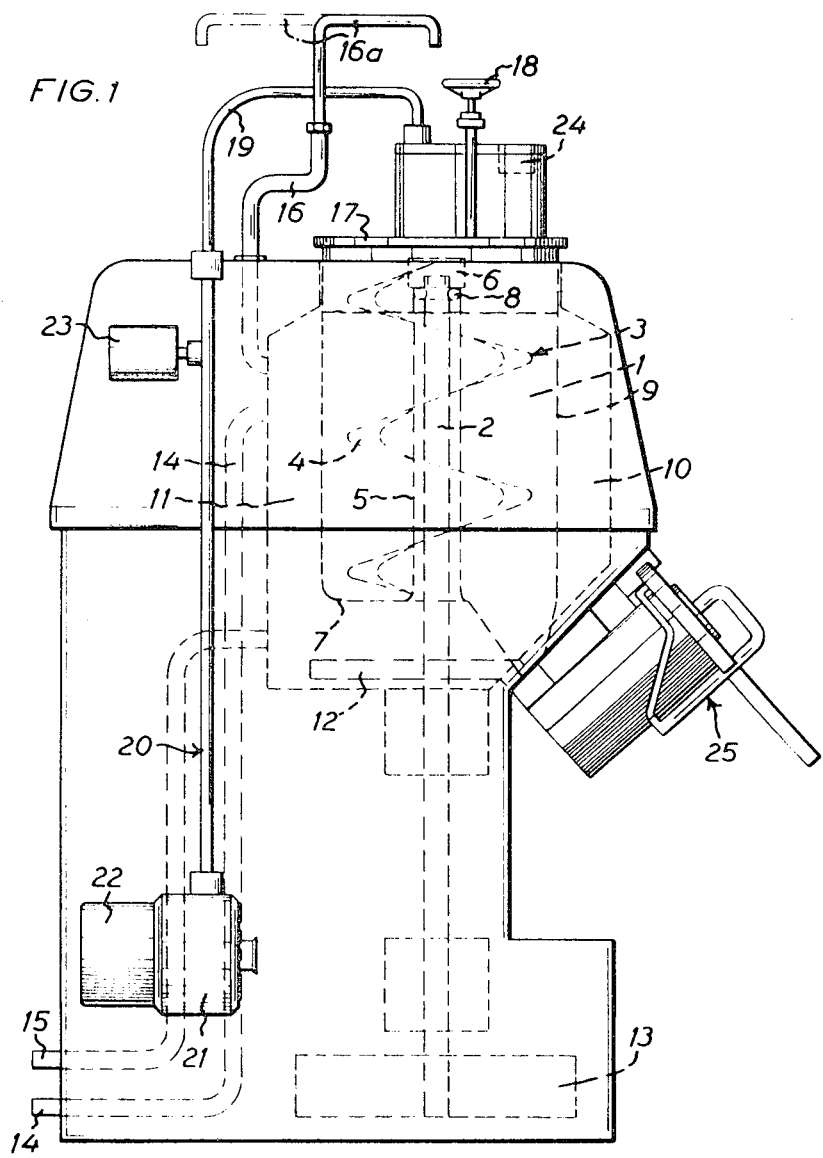

United States Patent

Ljung

[15] 3,638,557

[45] Feb. 1, 1972

[54] MACHINE FOR PREPARING MASHED POTATOES

[72] Inventor: Per-Henrik Ljung, Skolgatan 20, 211 52 Malmo, Sweden

[22] Filed: July 14, 1969

[21] Appl. No.: 841,364

[30] Foreign Application Priority Data

Jan. 7, 1969 Sweden.....................................116/69

[52] U.S. Cl......................................99/348, 99/100, 259/8
[51] Int. Cl. ........................................................A47j 27/17
[58] Field of Search ..................99/348, 324, 234; 259/9, 10, 259/7, 8, 25, 26, 45, 46, 107, 108, 109, 110

[56] References Cited

UNITED STATES PATENTS

| | | | |
|---|---|---|---|
| 2,557,622 | 6/1951 | Trier | 99/348 |
| 2,591,601 | 4/1952 | Peters | 99/348 X |
| 2,753,158 | 7/1956 | Rebechini | 99/348 |

*Primary Examiner*—Robert W. Jenkins
*Attorney*—Dos T. Hatfield

[57] ABSTRACT

A method of preparing mashed potatoes from a powdery or flaky potato material, comprising mixing the material and the liquid, subjecting the mix to a superatmospheric gas pressure, and maintaining said pressure during the time the mix is kept in readiness for serving and also during the intermittent dispensing of the mix.

4 Claims, 6 Drawing Figures

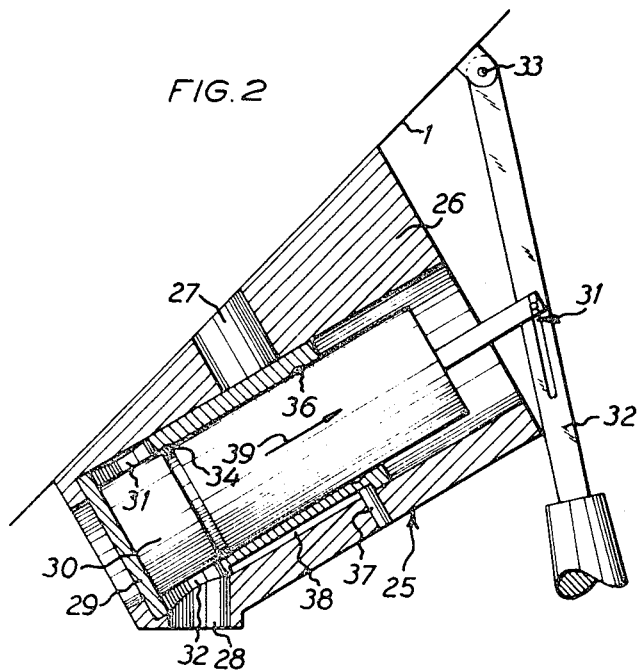
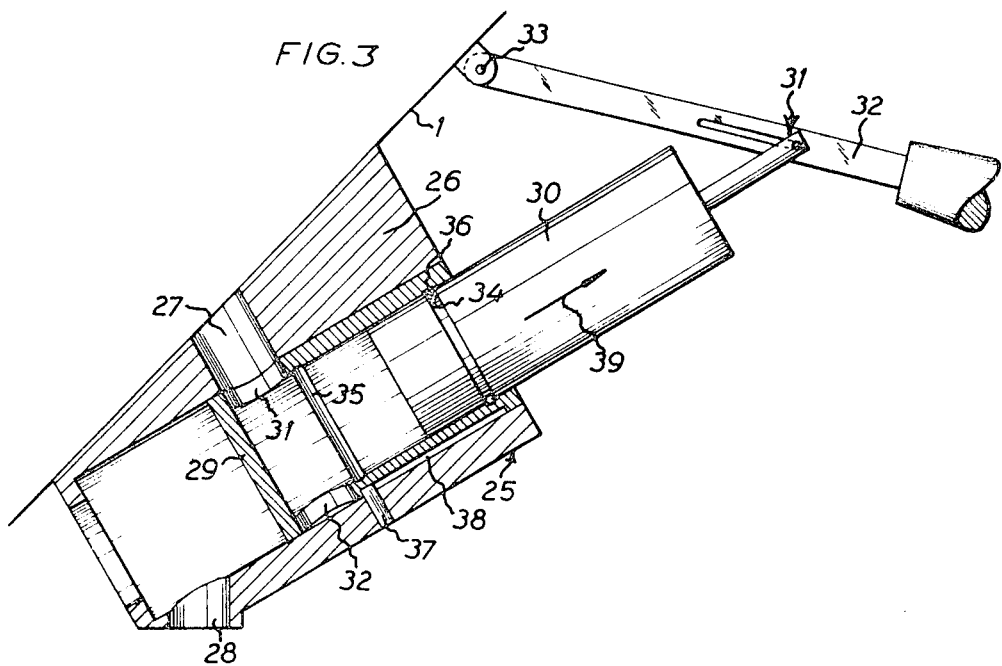

MACHINE FOR PREPARING MASHED POTATOES

This invention relates to a method of preparing mashed potatoes from a powdery or flaky liquid-miscible potato starting material. The method is carried out in a machine comprising a vessel with an agitator mounted for rotation on a shaft.

Mashed potatoes are highly appreciated and served int.al. in connection with the sale of hot dogs and other quick-lunch-type fancy dishes in hotdog stands, cafeterias, small restaurants, etc. This requires a type of mashed potatoes that can be prepared rapidly under fully satisfactory hygienic conditions, can be rapidly handed to the customer with maintained high quality and can be dispensed in portions that always contain the same amount of mashed potatoes irrespective of the skill of the waiting staff.

These objects are realized by the method suggested by the present invention, which comprises mixing the powdery or flaky starting material and the liquid, subjecting the resulting mix in the course of the mixing procedure to a superatmospheric gas pressure, maintaining said pressure during the time the mashed potatoes are kept in readiness for serving and also during the intermittent dispensing of predetermined portions of the mashed potatoes prepared, thus resulting in high porosity and easy dispensing of the mashed potatoes in predetermined portions.

The machine in which the mashed potatoes are prepared in the manner described comprises a vessel which has an agitator mounted for rotation on a shaft and which can be hermetically sealed and connected to a compressed air circuit, said vessel having means for dispensing the mashed potatoes in predetermined portions.

For greater clarity the invention will be described more in detail in the following with reference to embodiments, chosen by way of example, of the machine for preparing mashed potatoes.

Figure 6:
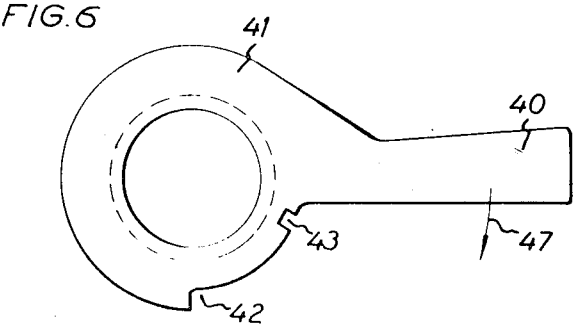
Figure 5:
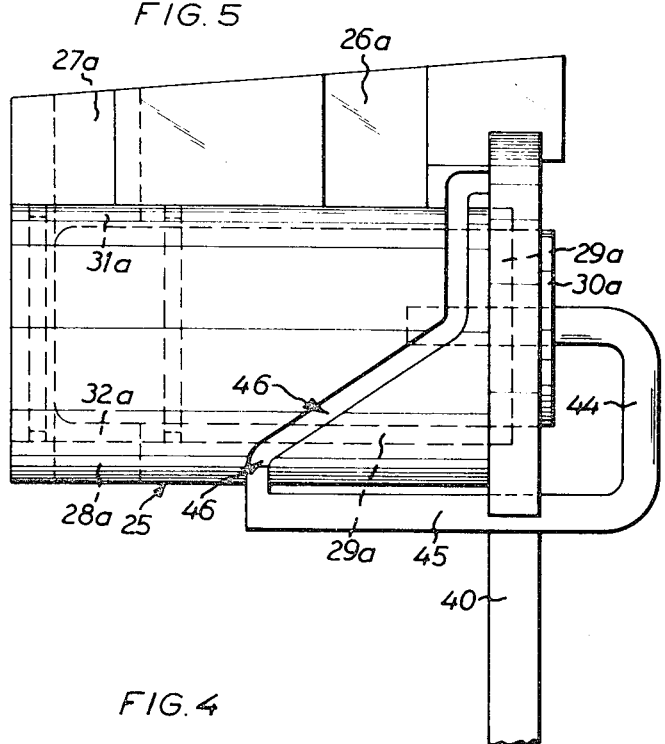
Figure 4:
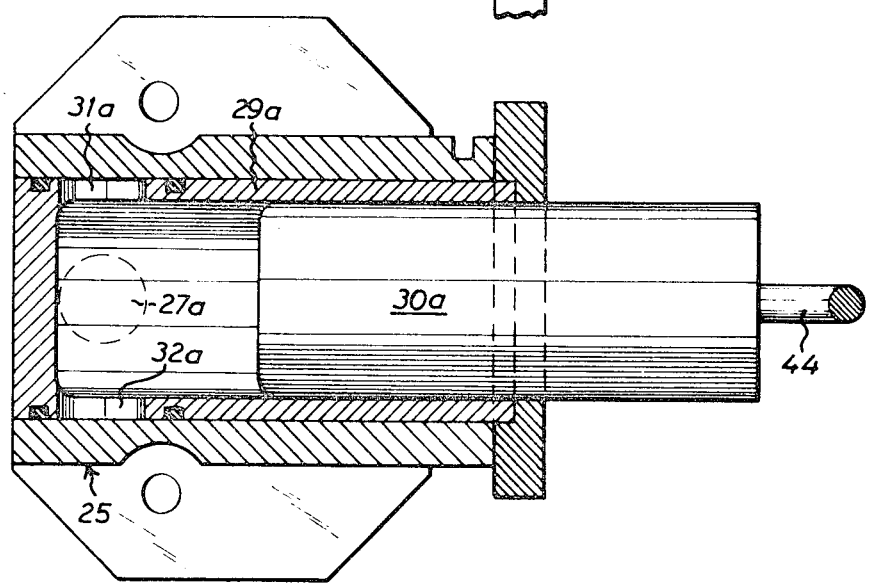

In the drawings:
FIG. 1 is a side elevation of the machine;
FIG. 2 is a section of the dispensing means of the machine;
FIG. 3 in a section corresponding to FIG. 2 shows the dispensing means in another position;
FIG. 4 is a section of a modified dispensing means;
FIG. 5 shows the modified dispensing means in another position;
FIG. 6 is a plan view of an operating handle for the modification shown in FIGS. 4 and 5.

The machine illustrated in FIG. 1 comprises a vessel 1 having an agitator 3 therein which is mounted for rotation on a shaft 2 and is in the form of a helically curving blade 4. Said blade 4 is fixed by means of a hub 6 to the end of the shaft 2 upstanding from a sleeve 5. The hub 6 is readily detachable from the shaft 2 with which it is nonrotatably engaged. The sleeve 5 is integral with the bottom 7 of the vessel 1 and at its upper end has a gasket 8 which permits the shaft 2 to rotate relative to the sleeve. The vessel 1 has double sidewalls 9 and 10 which enclose a cavity 11 which is intended as a liquid receptacle and equipped with a heating device in the form of a thermostat-controlled electric heating element 12 connected to a suitable current supply. By the intermediary of a suitable seal the shaft 2 is passed through the outer wall 10 of the vessel down to the foot of the machine where it is connected to an electric motor 13. The cavity 11 is connected to a water supply via a feed conduit 14 and to a drain via a discharge conduit 15. Extending from the cavity 11 is a manifold 16 having a swing arm 16a which can be swung to the operative position shown by full lines in FIG. 1 and which serves to transfer hot water to the vessel 1. The manifold 16 is connected to a timer-controlled valve (not shown) by means of which a suitable water quantity can be transferred to the vessel 1 at the same time as a suitable quantity of potato powder is poured into the vessel 1. A dome-shaped cover 17 serves to hermetically seal the vessel 1. The cover is held in position by a clamping device 18. Connected to the cover 17 is a line 19 which is part of a compressed air circuit 20 including a compressor 21 driven by a motor 22, and a pressure-operated switch 23 controlling the air pressure in the compressed air circuit 20. A safety valve 24 is mounted in the cover 17.

The machine further includes dispensing means 25 for dispensing the mashed potatoes in predetermined portions. The means 25 broadly is in the form of a valve having a housing 26 with an inlet passage 27 which connects the dispensing means 25 to the vessel 1, and with a dispensing nozzle or opening 28. The dispensing means 25 further comprises a cylinder 29 which is closed at one end and movable in the valve housing, an axially movable piston 30 being received in said cylinder 29 which has inlets and outlets 31 and 32, respectively. As will be described in the following, the machine has also associated with it means for moving the piston 30 and operating the cylinder 29.

In the embodiment of the dispensing means 25 illustrated in FIGS. 2 and 3, both the cylinder 29 and the piston 30 are arranged for axial movement. For this purpose the piston 30 is connected over a lost motion connection to a lever 32 which is pivoted at 33 in the machine in the vicinity of the dispensing means 25. For establishing a seal with respect to the cylinder 29 the piston 30 has an O-ring 34 which in certain positions of the piston 30 relative to the cylinder 29 can be caused to engage in annular grooves 35 and 36, respectively, provided in the inner wall of the cylinder. The axial movement of the cylinder 29 in the valve housing 26 is restricted by a pin 37 engaging in a groove 38 which is provided in the outer circumference of the cylinder and extends in the direction of the cylinder axis. For dispensing a portion of mashed potatoes the lever 32 is operated to move the piston 30 in the direction of the arrow 39. By the engagement of the O-ring 34 in the groove 35 the cylinder 29 is carried along in this movement of the piston until the axial groove 38 in the cylinder is engaged by the pin 37, whereby the cylinder 29 is arrested in a position in which the opening 31 thereof registers with the inlet 27 to the valve housing 26. At the further movement of the piston 30 in the direction of the arrow 39 the superatmospheric pressure in the vessel 1 will cause mashed potatoes to flow into the opened cavity in the cylinder until the O-ring 34 engages in the groove 36 when a maximum volume of mashed potatoes has been taken up by the dispensing means 25. At the operation of the lever 32 for moving the piston 30 in the opposite direction of the arrow 39 the cylinder 29 is carried along owing to the engagement of the O-ring 34 in the groove 36, and when openings 32 and 28 register the cylinder 29 reaches its initial extreme position in the valve housing 26. At the continued movement of the piston 30 the portion of mashed potatoes is extruded through the openings 32, 28 and finally the O-ring 34 again engages in the groove 35.

The modification of the dispensing means 25 illustrated in FIGS. 4 and 5 differs from the first embodiment in that the cylinder 29a is rotatable but axially nonmovable in the valve housing 26a. The openings 27a, 28a, 31a and 32a are so arranged in relation to each other than in one extreme position of the cylinder 29a the portion-determining cavity thereof will be in communication with the vessel 1 and in the other extreme position of the cylinder with the nozzle or opening 28a. For its rotation the cylinder has an operating handle 40 which is shown in plan view in FIG. 6. The hub 41 of the handle in its edge has an elongated recess 42 which at one end terminates in an indentation 43 for a purpose that will appear from the following. There extends from the upper end of the piston 30a a largely U-shaped member 44 one arm 45 of which passes through the elongated recess 42 in the transverse direction thereof, while the other bent arm of the U-shaped member 44 engages in a groove 46 provided in the outer circumference of the valve housing 26a. Said groove 46 is of such a shape that when the handle 40 is operated in the direction of the arrow 47 the cylinder 29a is rotated so that communication will be established between the portion-determining cavity of the cylinder and the vessel 1. During this rotation of the cylinder 29a the U-shaped member 44 slides in the recess 42 while the bent arm of said member 44 is kept engaged with the lower portion of groove 46, as is shown in FIG. 5. At further actuation of the handle 40 the piston 30a is rotated, and by the engagement of the U-shaped member 44 in the groove 46 the piston 30a during rotation is simultaneously moved axially so that mashed potatoes from vessel 1 can flow into the portion-determining cavity of the cylinder 29a. Upon actuation of the handle 40 in a direction opposite to the arrow 47 the cylinder 29a is first rotated so that the communication between said cylinder 29a and said vessel 1 is interrupted while communication is established between the cavity of the cylinder 29a and the dispensing nozzle 28a. At the continued actuation of the handle 40 the U-shaped member 44 is carried along rotating the piston 30a whose U-shaped member 44 moves along the groove 46 back to initial position thus moving the piston 30a which extrudes the portion of mashed potatoes from the cylinder 29a. The fact that during mixing, storage and dispensing the mashed potatoes are subjected to a gas pressure will facilitate dispensing of the mashed potatoes since the portion-determining cavity of the cylinder 29a will be filled without difficulty and also contribute to moving the piston 30a. Due to the higher pressure prevailing in the machine the mashed potatoes when dispensed will immediately expand and assume a fluffy and appetizing consistency. To the good quality will also contribute the pressure exerted by the agitator blade 4 on the mashed potatoes towards the bottom of the vessel where the mashed potatoes are kept well collected and exposed to the compressed air in the vessel. As the mashed potatoes are under the action of the superatmospheric pressure up to the very moment when the mash is sliced through and leaves the dispensing means it will retain a fluffy and appetizing character during consumption without collapsing.

Like the portioned supply of water, dispensing of the mashed potato portions can be realized with the aid of a time-controlled valve or a pump or feed screw.

Further modifications are possible within the scope of the appended claims.

What I claim and desire to secure by Letters Patent is:

1. Apparatus for preparing and dispensing, in predetermined portions to a retail customer, mashed potatoes in a fluffy and hot condition comprising a hermetically sealed vessel having a rotary agitator therein, heat exchange means in said vessel, means for introducing liquid in said heat exchange means, thermostatically controlled heating means for heating said liquid, an opening in said vessel for introduction of potato flakes or powder, means for introducing water to mix with the potato flakes or powder, means for rotating said agitator to mix said potato flakes or powder, means for introducing compressed air into said vessel to mix with the potato-water mixture, whereby mashed potatoes are maintained in said vessel in a heated fluffy condition under superatmospheric pressure, and means for dispensing a predetermined amount of hot fluffy mashed potatoes to a customer.

2. Apparatus as set forth in claim 1 wherein said dispensing means comprises a relatively slidable cylinder and piston and an actuator therefor, said cylinder having an inlet connected to said vessel for communication between the two and an outlet adapted to register with a dispensing opening, said cylinder having a pair of spaced annular inner and outer grooves therein, stop means to limit the sliding movement of said cylinder, said piston having an O-ring secured about its periphery and engageable with said annular grooves in said cylinder, whereby when said dispensing means is moved from a dispensing position to receive another quantity of mashed potatoes, the actuator moves the piston from the end of the cylinder outwardly, the O-ring enters the inner groove and moves the cylinder to a position where the inlet registers with communication with the vessel and the stop means prevents further sliding movement of the cylinder and further movement of the piston enlarges the potato receiving area of the cylinder during which time the O-ring secured to the piston moves from the inner groove to the outer groove, and reverse inward movement of the piston causes the cylinder to move to the dispensing position and further inward movement of the piston to the end of the cylinder forces the potatoes out of the dispensing means and the O-ring enters the inner groove.

3. Apparatus as set forth in claim 2 wherein said stop means includes a longitudinal groove in the outer periphery of the cylinder and a stationary pin is positioned in said longitudinal groove which limits the sliding movement of said cylinder.

4. Apparatus as set forth in claim 3 wherein the actuator has a lost motion connection with the piston.

* * * * *